US010472941B2

United States Patent
Park et al.

(10) Patent No.: US 10,472,941 B2
(45) Date of Patent: Nov. 12, 2019

(54) ELECTROMAGNETIC WAVE CONCENTRATED HEATING AND HEAT-ACTIVATED CHEMICAL REACTIONS OF ENHANCED SENSITIZERS FOR ENHANCED OIL RECOVERY

(71) Applicant: ESPARK ENERGY INC., Calgary (CA)

(72) Inventors: Simon Park, Calgary (CA); Seonghwan Kim, Calgary (CA); Rushi Vyas, Surrey (CA)

(73) Assignee: ESPARK ENERGY INC., Calgary (CA)

( * ) Notice: Subject to any disclaimer, the term of this patent is extended or adjusted under 35 U.S.C. 154(b) by 104 days.

(21) Appl. No.: 15/553,274

(22) PCT Filed: Feb. 25, 2016

(86) PCT No.: PCT/CA2016/050197
§ 371 (c)(1),
(2) Date: Aug. 24, 2017

(87) PCT Pub. No.: WO2016/134477
PCT Pub. Date: Sep. 1, 2016

(65) Prior Publication Data
US 2018/0073337 A1 Mar. 15, 2018

Related U.S. Application Data

(60) Provisional application No. 62/120,422, filed on Feb. 25, 2015.

(51) Int. Cl.
*E21B 43/24* (2006.01)
*C09K 8/584* (2006.01)
(Continued)

(52) U.S. Cl.
CPC .......... *E21B 43/2401* (2013.01); *C09K 8/584* (2013.01); *C09K 8/588* (2013.01); *C09K 8/592* (2013.01); *C09K 8/594* (2013.01)

(58) Field of Classification Search
CPC .. E21B 43/2401; E21B 21/003; E21B 33/138; E21B 36/04; E21B 7/14; C09K 2208/10; C09K 5/00; C09K 8/032; C09K 8/06; C09K 8/52; C09K 8/584; C09K 8/588; C09K 8/592; C09K 8/594
See application file for complete search history.

(56) References Cited

U.S. PATENT DOCUMENTS

| | | | |
|---|---|---|---|
| 2004/0031731 A1* | 2/2004 | Honeycutt | C10G 1/00 208/402 |
| 2012/0234536 A1* | 9/2012 | Wheeler | E21B 43/24 166/272.1 |
| 2015/0114646 A1* | 4/2015 | Price Hoelscher | E21B 33/138 166/302 |

* cited by examiner

Primary Examiner — Zakiya W Bates
(74) Attorney, Agent, or Firm — Palmer IP INC.

(57) ABSTRACT

Methods, systems and apparatus for enhanced oil recovery utilizing enhanced sensitizers with chemical blowing agents (CBAs) includes irradiation of electromagnetically activated sensitizers with electromagnetic (EM) waves. The injected enhanced sensitizers absorb the energy from EM waves which increases the temperature. The elevated temperature then activates chemical blowing agents to aid in fluidity of heavy oil or bitumen extractions. The released gases from CBAs also aid in upgrading by releasing desired gases which in turn reduces long hydrocarbon chains at elevated temperature along with catalysts.

14 Claims, 7 Drawing Sheets

(51) Int. Cl.
*C09K 8/588* (2006.01)
*C09K 8/592* (2006.01)
*C09K 8/594* (2006.01)

ELECTROMAGNETIC WAVE CONCENTRATED HEATING AND HEAT-ACTIVATED CHEMICAL REACTIONS OF ENHANCED SENSITIZERS FOR ENHANCED OIL RECOVERY

FIELD

Embodiments disclosed herein generally relate to a method of enhancing oil recovery and more particularly related to methods involving heat concentrating, enhanced sensitizers for heat activated chemical reactions.

BACKGROUND

Unconventional hydrocarbon resources are the future of the fossil fuel industry and the priority targets for development in North America. These resources include heavy oil from oil sands and carbonates, light-tight oil and liquid-rich shale. The main challenge of extracting these resources is that the hydrocarbon mobility in the reservoir is very low, requiring advanced, unconventional extraction methods.

In-situ heavy oil recovery has several advantages over ex-situ processes such as avoidance of mining costs, no solid waste disposal, potentially lower costs, and access to resources, etc. The conventional in-situ method to extract heavy oil/bitumen faces several challenges such as difficulties in establishing required fluidity, permeability, porosity, and possible contaminations, etc. Moreover, steam assisted gravity drainage (SAGD) or cyclic steam stimulation (CSS), the most commonly used in-situ extraction technologies, require a significant amount of energy to generate high quality steam while simultaneously ignoring associated greenhouse gas (GHG) emission. Accordingly, there have been growing demands for new technologies that are relatively more cost-effective, efficient, and environmentally friendly. The present invention surpasses the limitations of SAGD or CSS technology and responds to the call for better oil recovery technology. In recent years, the use of radio frequency (RF) or electromagnetic (EM) waves to heat heavy oil to lower viscosity has been considered as an alternative or an upgrade to SAGD or CSS technology.

In fact, EM radiations neither require steam nor heavy infrastructure to generate and pump steam into underground oil formations using thick pipes. The EM waves are generated by passing high-power electric signals of varying frequencies through antennas that are inserted along with the producer wells or horizontal pipes in underground oil formations. The effectiveness of EM waves to heat a target is inversely proportional to the distance of the target from the antenna but directly proportional to the target's permittivity or absorption of incident EM waves. EM waves typically attenuate with the inverse square or cube of the distance from the antenna, losing power rapidly when it is farther away from the antenna.

Also heavy oil/bitumen itself is a poor absorber of EM waves on account of its low permittivity. As it is heated over time, the permittivity or absorptivity of heavy oil/bitumen does not stay constant; however, it varies with temperature and viscosity.

As a result, the efficiency of existing EM heating techniques can diminish on the basis of heavy oil/bitumen's geological vicinity with respect to the antenna and their thermophysical properties.

Even with advanced technologies such as EM or RF radiation enhanced recovery, SAGD, CSS and electro-thermal dynamic stripping (ET-DSP™), unconventional hydrocarbon recovery is relatively expensive in comparison with the extracted crude oil from other parts of the world and the impact of extraction and processing methods on the environment is significant.

Accordingly, responding to the growing demands for reduction of water and energy usages and minimization of GHG emission is of great importance.

Enhanced Oil Recovery (EOR) and Upgrading

US 2014/0251607 to DOW Global Technologies discloses methods using a nonionic surfactant for EOR, where the nonionic surfactant is prepared with a double metal cyanide catalyst. The nonionic surfactant can be used as part of foam for use in EOR. An example of such foam includes the nonionic surfactant, carbon dioxide in a liquid or supercritical phase, and a diluent, where the nonionic surfactant promotes a formation of the foam formed of carbon dioxide and the diluent.

US 2014/0209304 to Ecolab USA Inc, discloses water-soluble polymers comprising hydrolysable cross-linked monomer units, and methods for recovering hydrocarbon fluids using aqueous flooding of a formation. The polymer comprising about 1 mol % to about 100 mol % acrylamide monomers, wherein, after introducing the aqueous flooding fluid into the formation, the hydrolysable cross-linked monomer units are hydrolyzed to produce an aqueous flooding fluid after hydrolysis having a viscosity that is about the same or higher than a viscosity of the aqueous fluid prior to injection.

US 2010/0175896 to BP Corp. North America Inc, teaches methods and compositions for catalytic heavy oil recovery. The novel colloidal catalysts are utilized, which may catalyze hydrogenation reactions in heavy oil deposits. These colloidal catalysts may be dispersible in supercritical fluids, which are also injected into the reservoir.

U.S. Pat. No. 3,408,417 teaches a method for thermal cracking of hydrocarbons including introducing combusting gases and hydrocarbons into a first zone, the latter at a speed of sound or greater, then passing the thereby mixed resultant through a constriction at the speed of sound or greater into a second zone for thermal cracking purposes, then quenching the reactants with a coolant.

US 2013/0168295 top FL Smith discloses different types of cracking employed: catalytic cracking and thermal cracking. Catalytic cracking uses a solid acid catalyst, such as aluminum oxide and silicon dioxide, in moderately-high temperatures to aid in the process of breaking down large hydrocarbon molecules into smaller ones. In thermal cracking, elevated temperatures and pressures are used to break the long chain alkanes down into shorter chain alkanes and alkenes. The catalyst serves to semi-crack the oil sands or oil shale during the retort step by breaking down long hydrocarbon chains to shorter chains. The preferred catalysts are zeolite catalysts, which provide high yields and selectivity for hydrocarbon fuel with higher-boiling point.

US 2013/0168094 to ConocoPhillips Company discloses methods and systems for enhanced recovery of heavy oil using selective catalyst downhole upgrading scheme in combination with SAGD technology. The method provides a cracking catalyst and then heats the cracking catalyst to a catalyst pre-heated temperature. Examples of suitable cracking catalysts include high surface area catalysts, such as nanocatalysts.

Microwave Based Methods

U.S. Pat. No. 8,337,769 to Harris Corp. teaches a method to heat petroleum ore, such as bitumen, oil sands, tar sands, oil shale, or heavy oil by mixing about 10% to 99% by volume of a substance such as petroleum ore with about 1% to 50% by volume of a substance comprising mini-dipole antenna susceptors. A mini-dipole susceptor is defined as any susceptor that reacts as a dipole antenna to RF energy, and which has a longest dimension less than 10 cm, 5 cm, 1 cm, or 0.5 cm. In this disclosure, thin filament-like conductive structures such as carbon fibers are distributed through the hydrocarbon ore as susceptors. The mixture of petroleum ore and mini-dipole susceptors is then subjected to an RF energy source to create heat.

U.S. Pat. No. 4,419,214 describes a method of separating bitumen and tars from shale oils and tar sands through the use of microwave treatment.

U.S. Pat. No. 4,153,533 teaches recovering oil from shale through microwave irradiation of feedstock under high pressure and in the presence of hydrogen and water vapor.

US 2013/000865 to ConocoPhillips Company teaches a method for more efficiently recovering hydrocarbon resources from a subterranean formation and while potentially using less energy and/or water resources and providing faster recovery of the hydrocarbons. Recovering hydrocarbon resources from infill wells based upon RF heating may comprise creating hydraulic communication between each pair of adjacent steam chambers and an associated infill well there between. Moreover, recovering hydrocarbon resources from the infill wells based upon RF heating may further comprise using SAGD to provide pressure support in the regions of the subterranean formation surrounding the infill wells.

U.S. Pat. No. 8,646,527 to Harris Corp. discloses use of a RF applicator to produce electromagnetic energy within a hydrocarbon formation where water is present near the applicator. A signal, sufficient to heat the hydrocarbon formation through electrical current, is applied to the applicator. The same or alternate frequency signals are then applied to the applicators that are sufficient to heat the hydrocarbon formation through electric fields, magnetic fields, or both.

U.S. Pat. No. 8,726,986 to Harris Corp. teaches a method for heating a hydrocarbon resource in a subterranean formation having a laterally extending wellbore. The method includes supplying RF power at a settable frequency from an RF radiator positioned within the laterally extending wellbore to heat hydrocarbon resource and start formation of a steam bubble adjacent the laterally extending wellbore, and while sensing an impedance matching value of the RF radiator.

US 2012/0234536 to Harris Corp discloses a method for heating heavy oil inside a production well by utilizing an activator. The activator is then excited with a generated non-microwave frequency from 0.1 MHz to 300 MHz. A catalyst is injected below the surface such that the catalyst contacts the heated heavy oil. The catalyst can be co-injected with the activator, pre-injected or injected after the initial heating. The suitable activators discussed in the invention are the same as those from U.S. Pat. No. 8,365,823. Catalysts may comprise organometallic complexes and peroxides.

Microwave/RF Based Sensitizers and Treatments

US 2004/0031731 discloses the use of microwave irradiation to extract hydrocarbon fuel from oil sand or shale. The method includes admixing the oil sand or shale with a sensitizer and then exposing it to microwave energy. Suitable sensitizers include activated carbon and metal oxides such as NiO, CuO, $Fe_3O_4$, $MnO_2$, $Co_2O_3$, and $WO_3$. The catalysts can be metal powder such as a para-ferromagnetic material, iron, copper, or nickel. The concentration range is approximately 0.5 to 10 wt % based upon the weight of the fuel oil being processed. The sensitizers and catalysts used in this invention are disclosed in U.S. Pat. No. 6,184,427.

US 2012/0138601 discloses a method and apparatus for the continuous processing of high molecular weight organic feedstock material. Sensitizers may be heated by microwave energy, and the feedstock material, sensitizer material and catalyst, may undergo reactions such as de-polymerization, olefin oligomerization, dehydrogenation, isomerization, naphthene ring formation, aromaticization and chain branching.

U.S. Pat. No. 8,365,823 to ConocoPhillips Company discloses a method for heating heavy oil by utilizing an activator. The activator is excited with a generated microwave frequency and heats the heavy oil. Activators include ionic liquids that may include metal ion salts and may be aqueous and inorganic anions such as halides. The activator could be a metal containing compound such as those from period 3 or period 4. In yet another embodiment the activator could be a halide of Na, Al, Fe, Ni, or Zn, including $AlCl_4^-$, $NiCl_3^-$, $ZnCl_3^-$ and combinations thereof. Other suitable compositions for the activator include transitional metal compounds or organometallic complexes. The more efficient anion is at coupling with the microwave/RF radiation the faster the temperature rise in the system.

U.S. Pat. No. 6,184,427 to Invitri Inc. teaches microwave and radio frequency irradiation in order to crack hydrocarbons and waste plastics into smaller molecular weight entities. Microwave activated cracking of liquid hydrocarbons usually requires a catalyst/sensitizer. The sensitizer used in the invention exhibits high dielectric loss at microwave and radio frequencies. The sensitizer may be activated carbon (pellets or powder), coal, transition metal oxides such as NiO, CuO, etc. The catalysts are obtained by impregnating a high surface area support material such as silica, y-alumina, Zeolite, activated carbon, etc.

U.S. Pat. No. 6,861,135 to Kimberly-Clark Worldwide Inc teaches a latent polymer composite which contains a heat-sensitive polymer material and a microwave sensitizer. Polymer materials useful as the latent polymer material include thermoplastic elastomers and Exxon 601, which is a proprietary polymer comprising from about 20 to about 30% by weight olefinic elastomer, from about 60 to 75% by weight ethylene copolymer, from about 4 to 10% by weight processing oil, and less than about 5% by weight other additives. Other useful polymer materials include ethylene-vinylacetate block or random copolymers, polyethylene-polyethylene oxide block copolymers, polypropylene oxide-polyethylene oxide block copolymers, polyesters, polyurethanes, polyacrylates, polyethers, and combinations thereof. Sensitizer materials useful in this invention include calcium chloride, carbon black powder, metal particles, metal oxides such as aluminum, copper, zinc, and their oxides, various ferrite containing materials such as barium ferrite and magnesium ferrite, magnesium acetate, and combinations thereof.

U.S. Pat. No. 6,797,126 to Reactive Energy LLC. teaches a method of desulphurizing and cracking fuel oil by mixing the fuel oil with a sensitizer and solid source of hydrogen to form an admixture followed by subjecting the admixture to microwave energy. The sensitizers and catalysts discussed are the same as those from US 2004/0031731. Desulphurizing additives are used, and they may consist of granulated limestone and other forms of $CaCO_3$, CaO, MgO, MgO—CaO, NaOH, KOH, and $NaHCO_3$.

Heat Activated Chemical Reaction Giving off Gas/Chemical Blowing Agents (CBAs)

U.S. Pat. No. 4,769,397 to Enron Chemical Company discloses a method of making a foam injection molded article, and dispersing an effective amount of a primary CBA into a polymer resin to form a mixture. The mixture is then heated whereby the activation system releases water and the sodium borohydride reacts with the water to produce hydrogen gas. Subsequently, the mixture is injected into a mold to obtain expansion of the polymer resin into a molded foam article.

U.S. Pat. No. 7,543,638 to Schlumberger Technology Corp. teaches placing a catalyst in a wellbore; and introducing an oxidizing agent into the wellbore to contact the catalyst such that a hydrocarbon in a formation is oxidized to produce heat and at least one gas. The catalyst may be one selected from platinum, palladium, rhodium, ruthenium, lead, manganese, nickel and metal oxides thereof.

All of the above mentioned methodologies typically require undesirably large quantities of water. It is therefore an object of the present invention is to provide methods for enhancing heavy oil/bitumen extractions and in-situ upgrading from oil sands, tight oil, oil shales, carbonates and where hydrocarbons are present.

SUMMARY

To overcome the challenges, the novel enhanced sensitizer uses EM activators that are specially engineered to have permittivity that are orders of magnitude higher than heavy oil/bitumen, making them ideal to transduce incident EM waves into heat. Then the concentrated heat triggers heat activated chemical reactions which generates additional heat and releases gases. The high pressure generated from released gas can further fracture oil sands, carbonates or oil shale and also increases volume of pores. Moreover, the released gases form small gas bubbles within bitumen called foamy oil, enhancing the oil fluidity. The combination of released gas, catalysts within the sensitizers, heat and pressure is transmitted onto heavy oil/bitumen thereby lowering its viscosity and promote in-situ upgrading of bitumen. The method can selectively heat while reducing viscosity to effectively direct flow of heavy oil/bitumen towards the gathering producer well. The novel sensitizers can be combined with existing recovery methods such as SAGD, CSS, or ET-DSP™ process.

A method for producing or extracting hydrocarbons from a hydrocarbon bearing formation comprises increasing the fluidity of the hydrocarbons in the formation, and extracting the more fluid hydrocarbons through wells disposed in the hydrocarbon bearing formation. In one embodiment, increases in fluidity can be achieved by exposing electromagnetically activated sensitizers disposed within the formation to electromagnetic radiation (EM) for activating EM sensitizers and heating the formation, without requiring use of additional water.

In a broad aspect of the invention, an in-situ method for increasing fluidity of hydrocarbons in a hydrocarbon bearing formation includes injecting electromagnetically activated sensitizers into the formation, exposing the electromagnetically activated sensitizers to radio frequencies for activating the sensitizers to heat the formation and reduce the viscosity of the hydrocarbons therein, and extracting or producing the heated hydrocarbons.

In another aspect of the invention, an electromagnetically activated sensitizer for increasing fluidity of hydrocarbons in a hydrocarbon bearing formation for use in enhanced oil recovery comprises at least one of an electromagnetically activated activator, a catalyst, and a chemical blowing agent.

In another aspect of the invention, a method for manufacturing an enhanced sensitizer comprises admixing a thermoplastic polymer with a mixture comprising at least carbon based energy activator, homogeneously dispersing the thermoplastic polymer and the mixture, creating a coating mixture, and uniformly spraying the coating mixture to cover at least one chemical blowing agent to create the enhanced sensitizer.

DETAILED DESCRIPTION

Figure 1A:
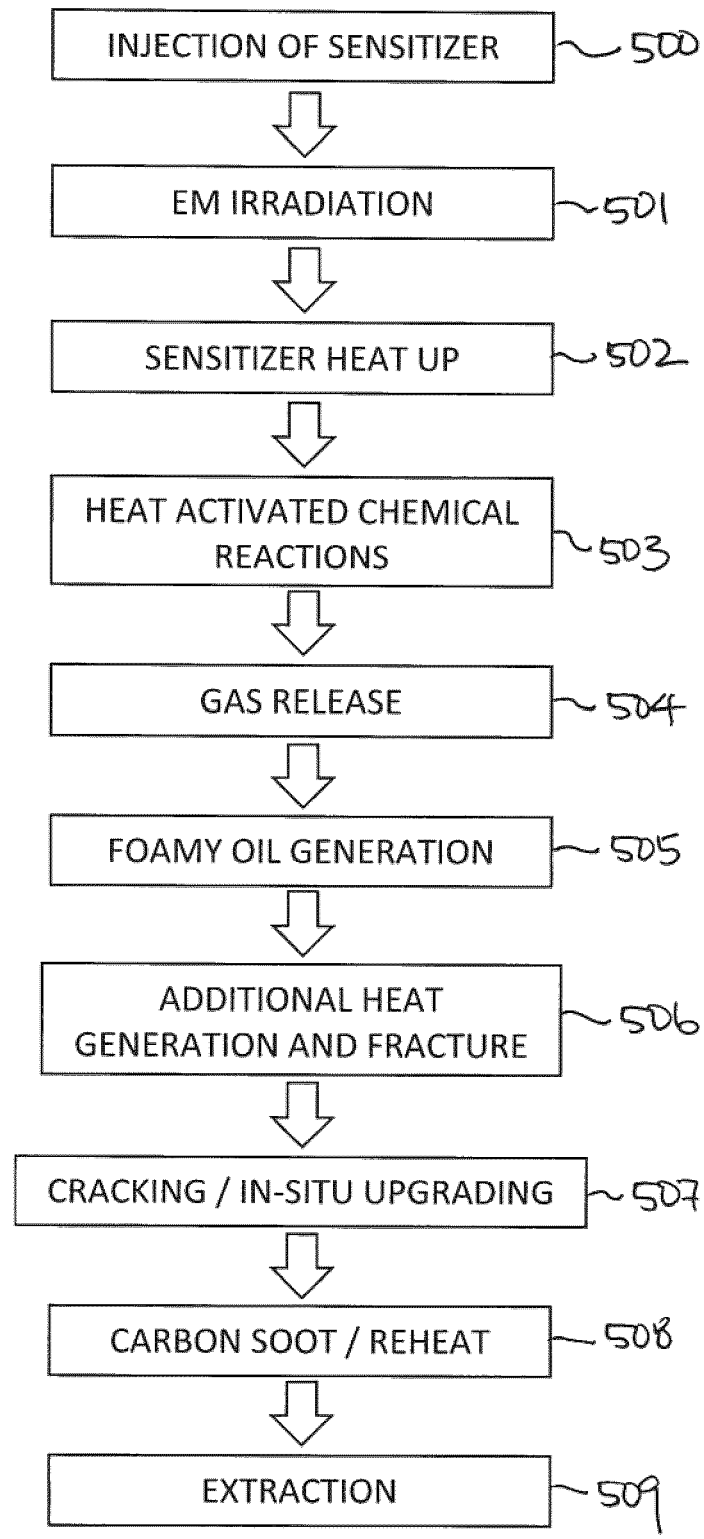
FIG. 1A is a flow chart illustrating steps of an embodiment of the present invention.

Worldwide energy demand is growing and conventional hydrocarbon resources have been limited. Therefore unconventional hydrocarbon resources such as oil sands, oil shale, tight oils, and carbonate oil where highly viscous hydrocarbon resources are trapped are actively explored. However, the high viscosity of heavy oil and insufficient permeability of geological formations do not permit conventional oil well productions.

Typically, these heavy oil deposits are extracted through open pit mining or in-situ extraction based on steam-assisted gravity drainage (SAGD) methodologies. In SAGD, high temperature steam is injected through an injection well which is drilled using directional drilling operations. Another producer well can be positioned to run below the injection well. The introduction of heat and pressure reduces viscosity of heavy crude oil or bitumen, and permits the bitumen to flow to the lower producer well and be extracted to the surface.

In order to enhance in-situ recovery, hydraulic fracturing is often applied to fracture harder formations such as shale or carbonates formations. Gases and solvents such as methane, pentane, propane, and carbon dioxide may be applied with or without steam to enhance extraction processes.

Some of challenges of SAGD include lengthy production times to extract hydrocarbons—due to requiring infrastructure for steam generations, water processing, etc., usage of large amount of water resources, and high greenhouse gas (GHG) emissions.

In order to improve unconventional hydrocarbon extraction methods and mitigate environmental footprints, an enhanced activator/sensitizer to enhance the radio frequency or electromagnetic (RF/EM) heating process of heavy oil/bitumen through the dispersion of novel additives in the geological vicinity of heavy oil/bitumen has been developed. Embodiments of the enhanced sensitizer can comprise nano materials, which absorbs electromagnetic (EM) energy, and other surfactants. The sensitizers absorb the EM energy, and dissipates the energy within the sensitizers as heat.

The surfactants of the enhanced sensitizers reduce the interfacial tension between oil and rock interfaces. Accordingly, injection of surfactants into the hydrocarbon formation can be used to generate foam which can aid in maintaining pressure on the injected steam within the reservoir to maintain the formation and to cause further permeation of formations.

Surfactants have a polar or charged head and hydrophobic tail. The head has a high affinity to polar molecules, such as water, whereas the tail has a high affinity to nonpolar molecules, such as oil. Embodiments of the present invention utilize surfactants to increase mobility of heavy oil/bitumen. Surfactants can be employed to reduce interfacial tension (or surface tension) between oil/water and oil/rock, which can free trapped heavy oil/bitumen in rock pores. Surfactants can also reduce interfacial viscosity of oil and high electrical repulsion between oil droplets and rock or sand, further increasing oil mobility.

Furthermore, combined polymer and released gas from chemical blowing agents (CBA's) can further permit open cell foam generation which can also maintains pore size and volume.

When enhanced sensitizers are properly dispersed within a hydrocarbon bearing formation, exposure of the enhanced sensitizers to electromagnetic energy can cause electrons to be emitted therefrom, causing electric arcing and rapid heating thereof. The rate of heating of the formation by EM energy can be very fast compared to other heating methods, such as SAGD. Moreover, the heating of the enhanced sensitizers can also trigger heat activated exothermic chemical reactions, which in turn produces additional heat, pressure and releases gases.

The combination of high temperature, pressure, and additional gases can fracture tight formations by applying multi-axial tensions thereby reducing viscosity of heavy oil/bitumen. In addition, the method enables to directly upgrade by cracking of heavy hydrocarbon chains into lighter hydrocarbons through the use of catalysts and combined heat, pressure and gases.

Additionally, the released gases can also create small gas bubbles within heavy oil/bitumen, causing an effect typically called foamy oil flow; thereby increasing the fluidity of heavy oil/bitumen.

As known by persons skilled in the art, foamy oil describes heavy oil containing dispersed gas bubbles and which typically exhibits superior performance in terms of oil production rate compared to a normal two-phase (oil-gas) flow. It is known that the viscosity of foamy oil is lower than the oil that is dissolved with same amount of the gas, which typically means desirably higher mobility of the bitumen. Reasons, such as partial de-asphalting, strong viscous coupling in two phase flow and gas/liquid slug flow in capillary; lubrication effect; and high internal pressure support which results in better production rate, may desirably all contribute to lowering the viscosity of bitumen in some embodiments.

As discussed above, the generation of gases by the initiation of exothermic reactions of the CBA's, in combination with increased pressures within the formation can create foamy oil which can result in high production rates of the hydrocarbon.

Porosity is another major factor affecting mobility of oil in a porous media. Embodiments of the present invention utilize various CBA's to increase porosity of the reservoir by generating gas at high pressure. Highly pressurised gas can enlarges pores within the formation. It is believed that the addition of enhanced sensitizers comprising CBA's can result in increases in pore volume of up to 200% as compared to normal pore sizes in soil.

Accordingly, formation rock can be fractured in the cases of carbonate or oil shale reservoirs and the fluidity of heavy oil/bitumen can be improved by increased permeability by increasing porosity and generating paths within the formation for the bitumen to flow. In addition, non-permeable cap rock formation that covers reservoir helps the gases to stay within the reservoir.

In an embodiment, in-situ burning produces carbon soot, which can be reused to heat the reservoir.

In another embodiment, enhanced sensitizers, and/or combinations of sensitizers, catalysts, surfactants, and CBAs in a polymeric matrix, can be injected into the formation, such as by or through hydraulic fracturing fluids, steam, and flooding methods, for example.

Electromagnetic Irradiation

Electromagnetic Waves from 40 KHz to 30 GHz

The ability of any material to transduce incident electromagnetic fields into heat is a function of the field's power that it dissipates ($P_D$) within it. The electromagnetic power dissipated within a material is dependent on the magnitude (E) and frequency (f) of the incident electromagnetic field, the material's relative permittivity ($\varepsilon'$) and electromagnetic loss tangent (tan δ) as shown in Equation 1. Preliminary analysis demonstrates the sensitizers' nanocomposite coat is able to dissipate significantly more amounts of incident electromagnetic (EM) radiation as heat compared to naturally found materials in oil sand formations. Depending on the concentration of materials within oil sand formations, conventional radio frequency (RF) heating without the use of sensitizers can dissipate only between 0.02 and 3.77 mW/cm$^3$ per given unit of incident electric field (E) as heat. By comparison the nanocomposite coat on sensitizers can dissipate up to 187 mW/cm$^3$ per given unit of incident electric field. This higher power dissipation translates into enhanced sensitizers being able to heat up the CBA/solvents using much less EM energy at much further distance from the antenna-EM source. Heating experiments carried out with a microwave oven validate these results. Sand mixed with CNT (3% by volume) and Graphene (1% by volume) in polymeric matrix heat up to temperatures of 177 and 232 degrees Celsius after only 5 minutes of microwave heating. Plain sand by comparison heats up to only 140 degrees Celsius.

$$P_D = 55.61 \times 10^{-14} \times |E|^2 \times f \times \varepsilon' \times \tan \delta \qquad (1)$$

Table 1 provides a summary of test results illustrating the ability of various nanocomposite coatings to dissipate heat. As shown, in one embodiment, a carbon black nanocomposite coating may desirably provide the highest dissipation of heat, followed by a CNT nanocomposite coating.

TABLE 1

| | | Frequency | Permittivity | | Loss Tangent | | Power Dissipation (mW/cm$^3$) | |
|---|---|---|---|---|---|---|---|---|
| | | (GHz) | Lower | Upper | Lower | Upper | Lower | Upper |
| Oil Sands | Sand | 2.45 | 4 | 5.4 | 0.07 | 0.1 | 0.382 E$^2$ | 0.74 E$^2$ |
| | Water | 2.45 | 52 | 86.5 | 0.007 | 0.032 | 0.496 E$^2$ | 3.77 E$^2$ |
| | Bitumen | 2.45 | 2.82 | 2.92 | 0.005 | 0.023 | 0.019 E$^2$ | 0.091 E$^2$ |
| Sensitizers | CNT | 2.45 | 35 | 40 | 0.25 | 1.14 | 11.92 E$^2$ | 62.13 E$^2$ |
| | Carbon Black | 2.45 | 45 | 165 | 0.35 | 0.83 | 21.46 E$^2$ | 186.59 E$^2$ |
| | Activated Carbon | 2.45 | 14 | 60 | 0.57 | 0.8 | 10.87 E$^2$ | 65.40 E$^2$ |
| | CSi nanofiber | 2.45 | 0.35 | 0.85 | 0.58 | 1 | 0.28 E$^2$ | 1.16 E$^2$ |
| | Graphene Nano-ribbons | 2.45 | 2 | 12 | 0.005 | 0.04 | 0.014 E$^2$ | 0.654 E$^2$ |

Materials

Certain embodiments of the present invention utilize enhanced sensitizers that comprise multiple compositions (carbon based nanomaterials, chemical blowing agents, ferromagnetic materials, catalysts, surfactants, etc.) and others, which can absorb microwave or EM energy. However, a polymeric matrix, which does not absorb microwaves, can be used as a binder to provide desired dielectric properties, such as to create electric arcing.

Embodiments of the enhanced sensitizers may be characterized by moderate dielectric properties with relatively high electrical resistance. The amount of microwave absorption depends on the permittivity of materials. Embodiments of the enhanced sensitizers can comprise materials which can strongly absorb electromagnetic waves that rapidly heat up and transfer the heat to chemical blowing agents (CBA's). The CBA's then go through heat activated, exothermic chain reactions, which in turn produces gases and vapours at specified decomposition temperatures.

In preferred embodiments, the enhanced sensitizers can comprise a combination of following: heat absorbers, such as carbon nanotubes (CNTs), graphenes, carbon nano fibers, graphites, carbon black, activated or amorphous carbons, etc., and ferromagnetic materials, such as iron, cobalt, barium, strontinum, nickel, zinc, etc.; catalysts, such as metal oxides (for example iron oxide, zinc oxide, titanium oxide, aluminum oxide, etc.) or zeolites; surfactants, for example, anionic surfactant (sodium stearate, sdium dodecyl sulfate, etc.), cationic surfactant (laurylamine hydrochloride, cetyl trimethylammonium bromide, etc.), non-ionic surfactant (polyoxyethylene alcohol, polysorbate 80, ethylene glycol distearate, etc.); polymers; aluminum metal nanoparticles; and chemical blowing agents and combinations thereof, for example, azodicarbonamide (ADC), P-toulene-sulfonylhydrazide (TSH), 4,4-oxybisbenzenesulfonylhydrazide (OBSH), 5-phyenyltetrazole, sodium bicarbonate, sodium borohydride, hydrogen peroxide, sodium peroxide, etc.

Chemical blowing agents may typically have different activation temperatures. By mixing different combinations of two or more chemical blowing agents, it may desirably be possible to activate multiple reactions depending on the temperature levels. Further, it is believed that coating the chemical blowing agents through use of tumbler and spraying methods can desirably prolong the life of enhanced sensitizers.

Table 2 summarizes various chemical blowing agents and their properties which can be incorporated into embodiments of the present invention.

TABLE 2

| Chemical Blowing Agent | Decomposition Temperature (° C.) | Gas Yield (ml/g) | Liberated Gas | Endo/Exo |
|---|---|---|---|---|
| ADC (Azo-dicarbonamide) | 200-230 | ~220 | $N_2$, CO, ($NH_3$, $CO_2$) | Exo-thermic |
| TSH (p-toulene-sulfonylhydrazide) | 110-140 | ~120 | $N_2$, $H_2O$ | Exo-thermic |
| OBSH (4,4-oxy-bisbenzenesulfo-nylhydrazide) | 140-165 | ~125 | $N_2$, $CO_2$, $H_2O$ | Exo-thermic |
| 5-PT (5-phyenyl-tetrazole) | 240-250 | ~200 | $N_2$ | Exo-thermic |
| Sodium Bicarbonate Citric Acid | 150-230 | ~165 | $CO_2$, $H_2O$ | Endo-thermic |

FIG. 1A illustrates an embodiment of a process for enhanced oil recovery using electromagnetically activated sensitizers comprising chemical blowing agents. As shown, the EM activated sensitizers (step 100) can be injected downhole using known methods for disposing the sensitizers within a hydrocarbon bearing formation. In a preferred embodiment, the sensitizers can be injected into the formation during normal fracturing operations. Once the sensitizers are disposed with the formation, an antenna can be employed to expose the sensitizers to electromagnetic radiation (EM) such as radio waves or frequencies, to activate the sensitizers (step 501), causing the sensitizers to rapidly heat up to a threshold temperature (step 502). In one embodiment, upon reaching the threshold temperature, the sensitizers initiate exothermic chemical reactions (step 503) within the hydrocarbon bearing formation to release gas (step 504) and create foamy oil (step 505). In one such embodiment, the heat activated chemical reactions may further provide additional heat which can assist with further fracturing of the formation (step 506), and/or further reduce viscosity of the hydrocarbons.

Figure 1B:
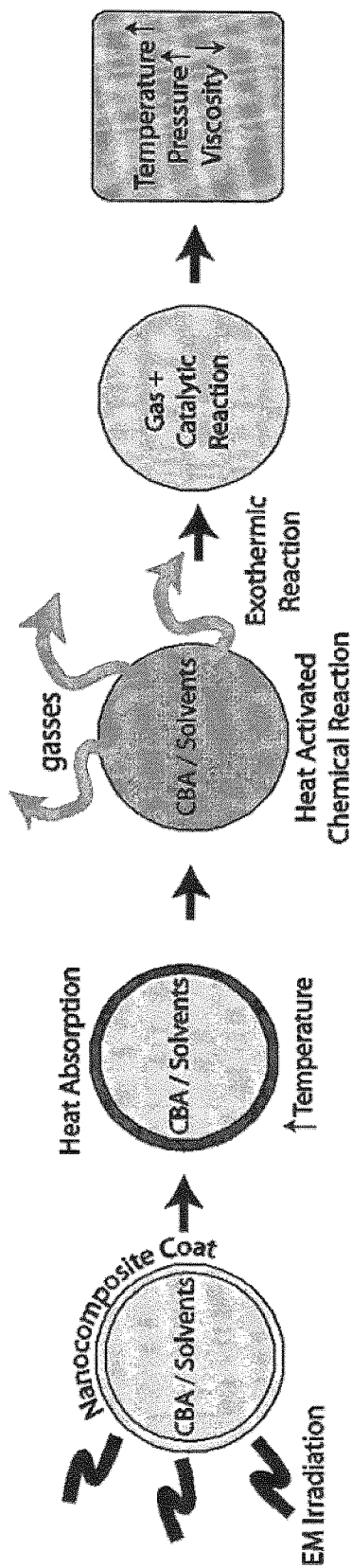
FIG. 1B is a schematic representation of steps of FIG. 1A, illustrating the steps involved in exposing sensitizers to electromagnetic radiation for heating a hydrocarbon bearing formation, in accordance to FIG. 1A.

With particular reference to FIG. 1B, in one embodiment, the release of gas, in combination of the release of additional heat and pressure (from the exothermic reaction) may desirably reduce viscosity of the hydrocarbons in the formation and provides cracking and in-situ upgrading. In a further embodiment, the process of exposing the injected sensitizers to EM radiation to cause cracking and in-situ upgrading can be repeated as necessary, and the upgraded hydrocarbons can be extracted or produced using known methods.

Figure 2:
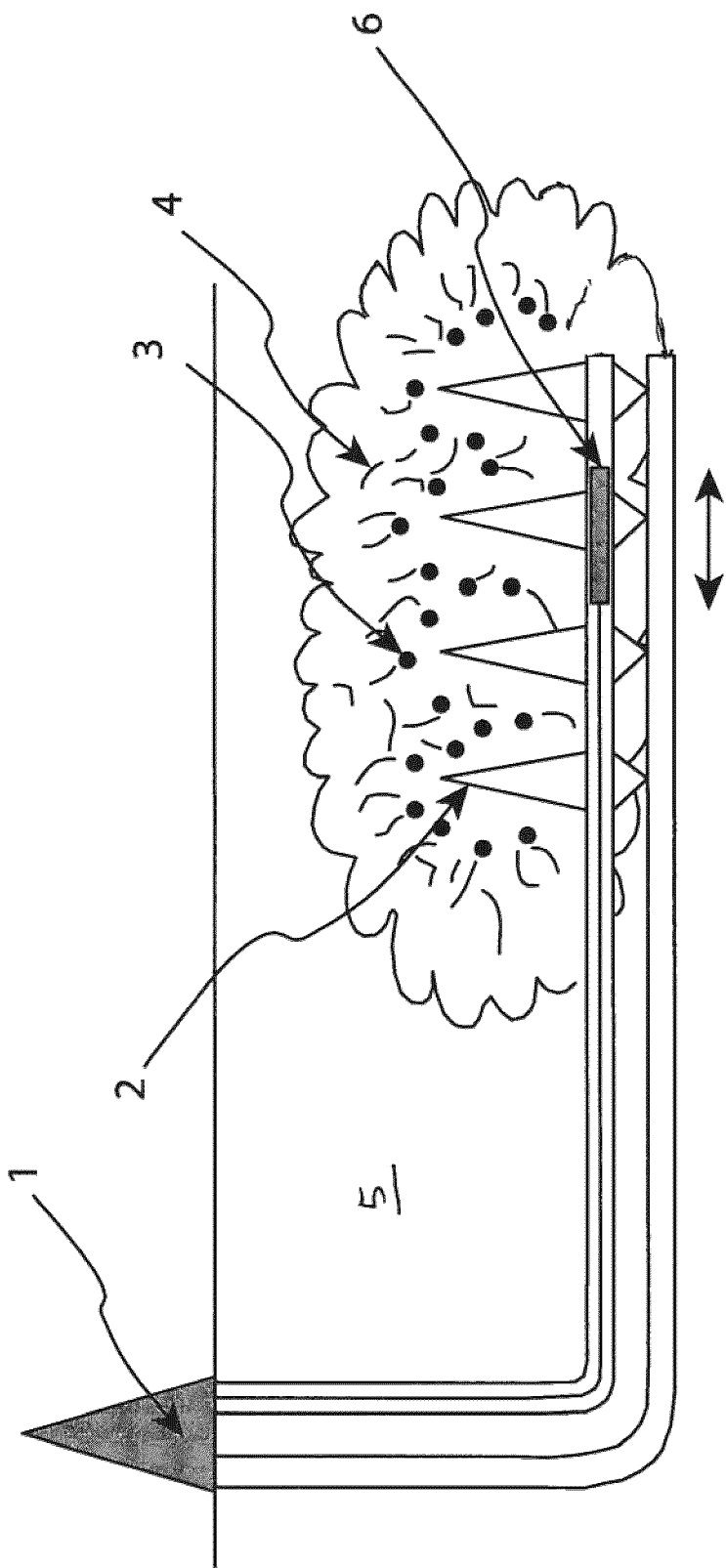
FIG. 2 is a schematic representation of an embodiment of the present invention, illustrating the injection of sensitizers into a hydrocarbon bearing formation for heating the hydrocarbon bearing formation.

FIG. 2 demonstrates the injection of the EM activated sensitizers for disposition within the hydrocarbon bearing formation 5 in accordance with an embodiment of the invention. In a preferred embodiment, and as shown, hydraulic fracturing fluid 2, admixed with the EM activated sensitizers (enhanced sensitizer) 3 may be injected into the formation 5 through an injector well 7 such as through normal hydraulic fracturing operations. Once hydraulic fracturing and/or injection of the enhanced sensitizers 3 is complete, a source of electromagnetic radiation (EM), such as an antenna 6, can be run into the wellbore and actuated therein. In one such embodiment, the antenna 6 may be removed within the wellbore while actuated such as according to a reciprocating motion. In one embodiment, as the antenna 6 moves back and forth along a horizontal portion of the wellbore, it can emit EM radiation that activates the enhanced sensitizers 3, causing the enhanced sensitizers to rapidly heat up to a threshold temperature.

Referring back to FIG. 1B and shown in FIG. 2, upon reaching the threshold temperature, in one embodiment, the enhanced sensitizer initiates an exothermic reaction within itself. The exothermic reaction releases gases 4, creates additional heat and increases a pressure about the enhanced sensitizers 3.

Skilled persons would understand that the combination of released gases, increased temperature and increased pressure may desirably cooperatively work to enlarge pore sizes of the formation, reduce viscosity of the hydrocarbons therein and create foamy oil, which increases the fluidity of the hydrocarbon and permits extraction or production thereof.

Figure 3:
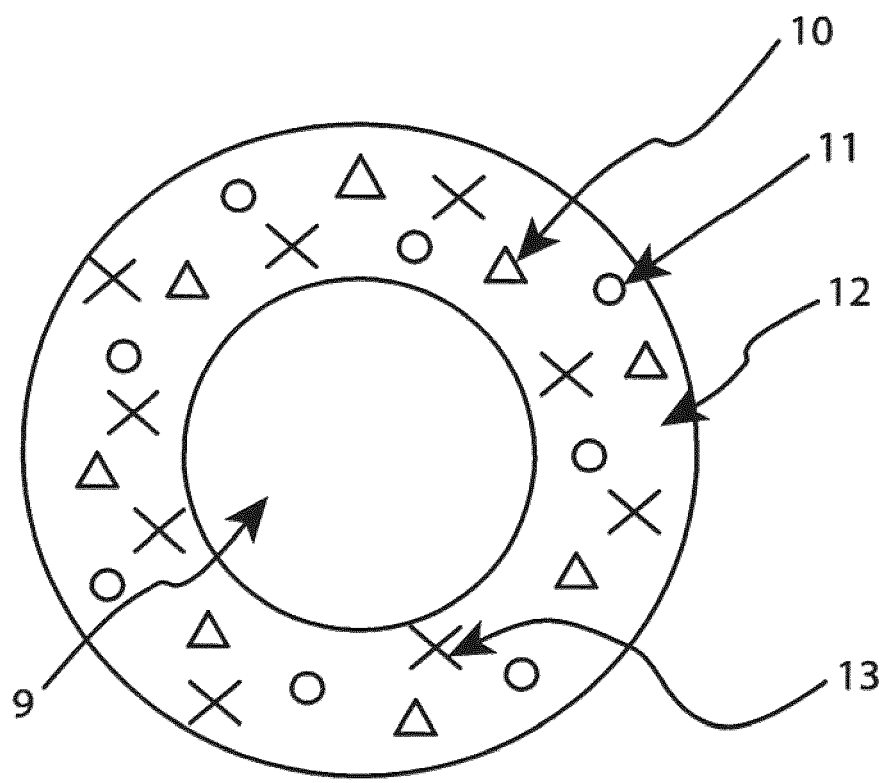
FIG. 3 is a schematic representation of an embodiment of an electromagnetically activated sensitizer.

FIG. 3 illustrates the constituents an electromagnetically activated or enhanced sensitizer in accordance with an embodiment of the present invention. As shown, in a preferred embodiment, an enhanced sensitizer can is comprised of a chemical blowing agent core (CBA) 9, coated or mixed with a composition comprising carbon based electromagnetically activated activators 10, metal oxides 11, and other additives 13, such as for example aluminum foil, or hydrogen peroxide). As also shown, in one embodiment, the coating of the activators 10, metal oxides 11, and additives 13 can be held together within a thermoplastic polymer matrix 12.

In accordance with an embodiment of the invention, the carbon based activators 10 may desirably have inherent characteristics that become activated at a threshold temperature. Upon reaching its threshold temperature, the activators impart microwave heat to rapidly initiate an exothermic reaction involving the chemical blowing agent (CBA) 9 in cooperation with the metal oxides 11 and other additives 13. The metal oxides 11 serve to catalyze the exothermic reaction and in-situ upgrading, while the other additives, such as for example aluminum foil and/or hydrogen peroxide may assist with exothermic reactions, such as combustion.

Several experiments were conducted to examine the performance of enhanced sensitizers comprising CBAs. In one embodiment, the experiments were conducted using a 2.45 GHz electromagnetic source at 1000 watts. An IR thermal camera and fiber optic temperature sensor was used to measure temperature. Various combinations of enhanced sensitizers were mixed with sands and bitumen and performed extraction tests.

Table 3 summarizes the maximum temperature reached by various substrates (ie. sand without and with two different sensitizers) absent any CBA's. Table 4 summarizes the maximum temperature reaches by the substrates when CBA's were incorporated into the sensitizer, in accordance with an embodiment of the invention. As shown in Table 4, sensitizers in the presence of CBA's showed a significant increase in the maximum temperature reached.

TABLE 3

| | Condition | | | |
|---|---|---|---|---|
| | Sand only (before) | Sand only (after 5 min.) | Sensitizer A (after 5 min.) | Sensitizer B (after 5 min.) |
| Max temp. | 27.5° C. | 140° C. | 177° C. | 232° C. |

TABLE 4

| CBA | CBA 1 | CBA 2 | CBA 3 |
|---|---|---|---|
| CBA only(1 wt %) | — | 119° C. | 125° C. |
| CBA (1 wt %) + Sensitizer 1 (1 wt %) | 138° C. | 130° C. | Burned |
| CBA (1 wt %) + Sensitizer 2 (1 wt %) | 275° C. (burned) | 170° C. | 271° C. (burned) |

Table 5 summarizes increase in volume as a result of activation of the CBA (upon EM irradiation). As shown, CBA 1 in a sand substrate burnt at 5 mins and there was only a slight change in volume. In the case for CBA 2, the volume of sand increased by 100%.

For example, if the average diameter of coarse sands is estimated to be about 0.5 mm, the porosity of sand is calculated to be 38%, thus the average pore size is calculated to be $(38/62) \times 0.5 = 0.306$ mm, considering 100 mL of volume of pores and sand, 62 mL is sand particles and 38 mL is pores. When the volume is doubled, the volume of pores is now 138 mL and the volume of sand particles still remains 62 mL. Accordingly, the new average size of the pores is $(138/62) \times 0.5 = 1.11$ mm. This represents approximately a 260% increase in the average pore size.

TABLE 5

| Condition | CBA 1 + Sensitizer 2 | CBA 2 + Sensitizer 2 |
|---|---|---|
| Volume Change | 0% | 100% |

Table 6 below summarizes the results of extraction of hydrocarbons from Athabasca bitumen sample, from a simulated reservoir setup, according to an embodiment of the invention. After 15 minutes of exposure to EM irradiation, approximately 48.2% of bitumen from the simulated reservoir setup was recovered.

TABLE 6

| | Condition | | |
|---|---|---|---|
| | Sand only | Heat Absorber 2 w/o CBA | Heat Absorber 2 w/CBA |
| Yield | 34.0% | 42.0% | 48.2% |

*1 wt % for each additives, 15 min.

Figure 5:
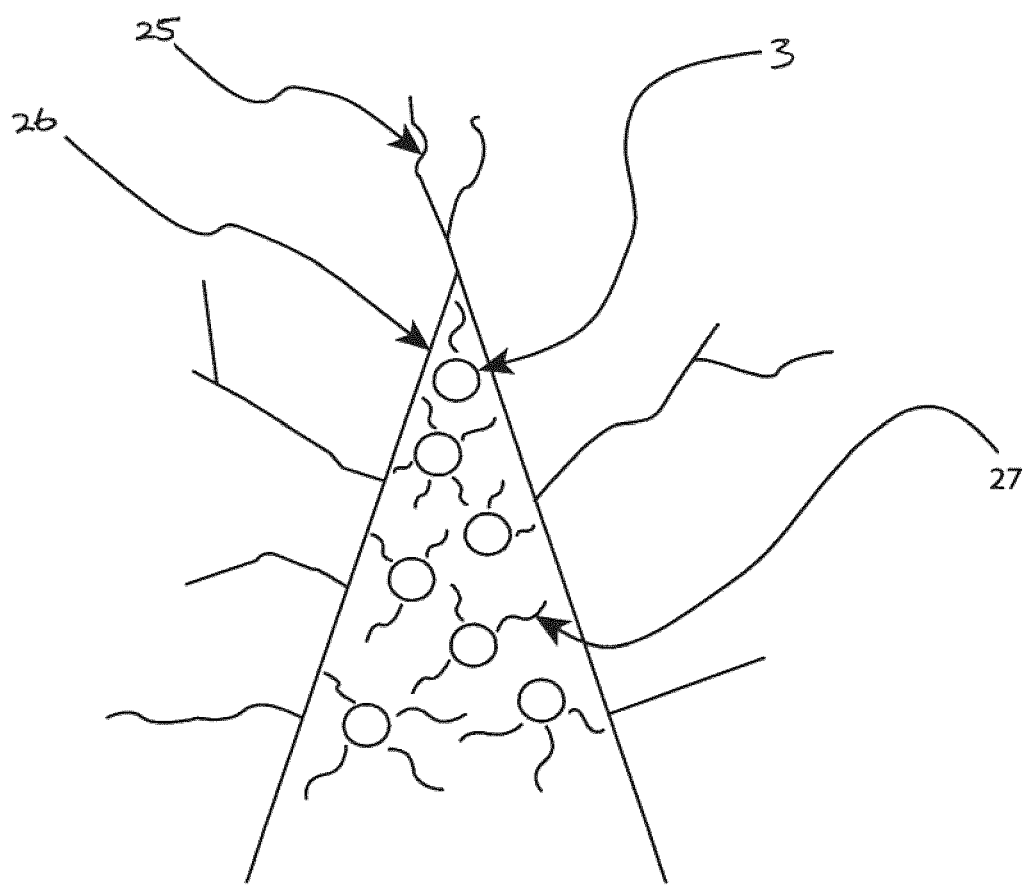
FIG. 5 is a schematic representation of an embodiment of the present invention, illustrating fracturing of a portion of a hydrocarbon bearing formation.

With reference to FIG. 5 and referring back to FIGS. 1A and 1B, heat activation of the enhanced sensitizers 3 disposed within the hydrocarbon formation desirably causes the enhanced sensitizers to fracture the subterranean formation, as illustrated. As shown in FIG. 5, in one embodiment, the enhanced sensitizers 3 can be irradiated by electromagnetic radiation, such as microwaves, which are absorbed by the carbon based electromagnetically activated activators to heat the sensitizers 3. The resulting heated sensitizers activate the chemical blowing agents (CBA's) to cause an exothermic reaction that releases gases 27 within the hydrocarbon bearing formation. The build-up of the released gases 27 accumulate to increase pressure within the formation and ultimately causes fractures 25 to form within the formation. In embodiments where the enhanced sensitizers 3 were disposed within the formation during hydraulic fracturing, the build up or increase in pressure within the formation can further enlarge and/or propagate existing fractures 26 created during hydraulic fracturing.

Figure 6:
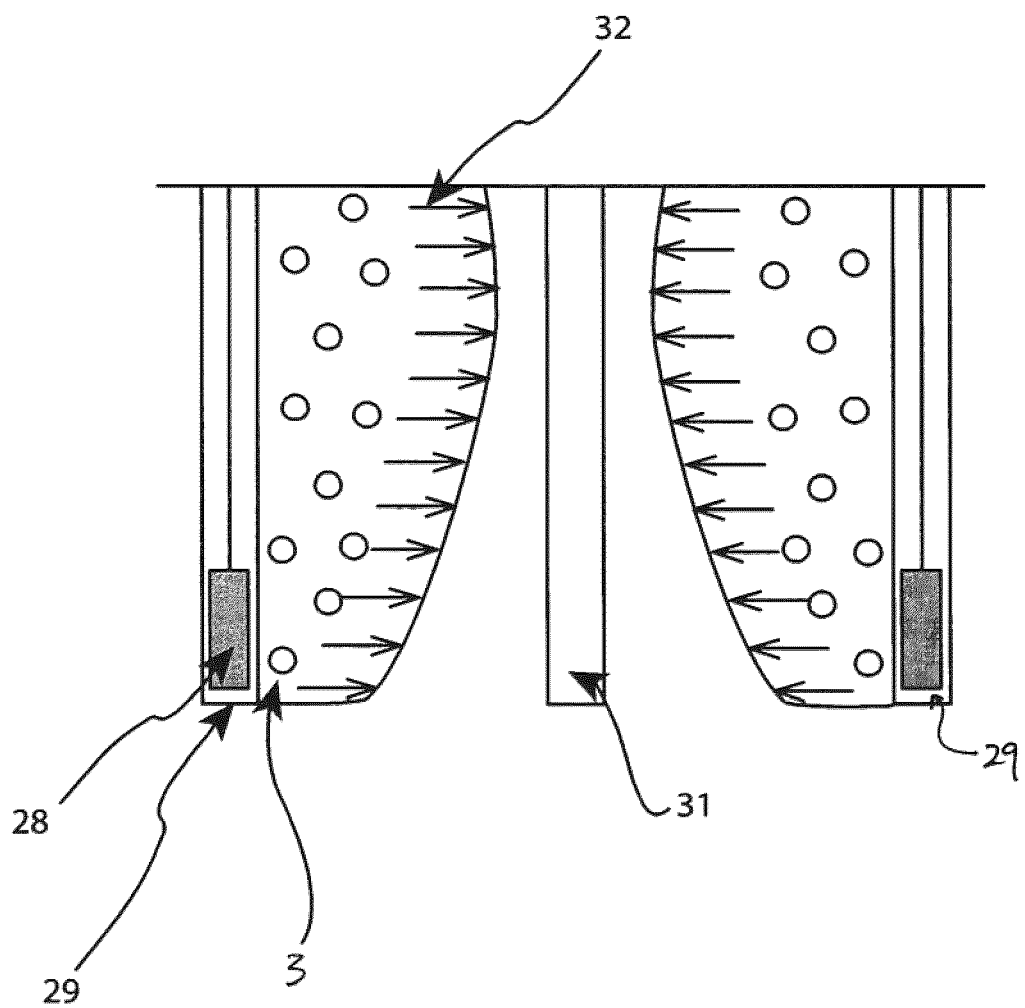
FIG. 6 is a schematic representation of an embodiment of the present invention, illustrating liquid flooding for hydrocarbon extraction.

In one embodiment, selective irradiation of the sensitizers can be employed to selectively heat and thus effectively direct flow of heavy bitumen towards a production well. As shown in FIG. 6, a method employing selective irradiation is illustrated. In one such embodiment, two or more injector wells 29, 29 can be drilled to access a hydrocarbon bearing formation. In between the two injector wells 29,29, a third production well 31 can be positioned.

As shown, each injector well 29 can include an electromagnetic source, such as an antenna 28. The electromagnetic sources 28,28 can be activated to selectively radiate electromagnetic waves for activating the enhanced sensitizers 3 disposed within the formation. The electromagnetic waves can be absorbed by the carbon based activators and initiate exothermic reactions with the CBA's to release gases and increase the pressure within the formation. Hydrocarbons reacting to the release of gases and increased heat may then desirably migrate towards the production well 31 and be produced therefrom. In one embodiment, the selective radiation of the sensitizers can desirably be employed to generate a temperature gradient and/or a pressure gradient which can direct the flow of hydrocarbons or bitumen, such as towards a production well, for example.

Manufacturing of Sensitizers

According to one embodiment, the present disclosure contemplates an enhanced sensitizer that comprises a thermoplastic polymer admixed with a plurality of different sensitizer materials homogeneously dispersed using ultrasonication. In one embodiment, a surface spray system, capable of dynamic movements and comprising a single nozzle for spray coating a target substrate and having a control mechanism for the nozzle can be used. In one such embodiment, the surface spray system may be capable of using multiple inks, such as may be used to provide multiple different sensitizer materials.

In an embodiment, an ink can comprise a polymer matrix and a plurality of nanoparticles distributed within the polymer matrix. Such an ink may comprise a thermoplastic polymer admixed with heating sensitizers, catalysts, surfactants, etc. which may be sprayed on to one or more chemical blowing agents. In one such embodiment the chemical blowing agents may be rotated while the ink is uniformly sprayed.

Figure 4:
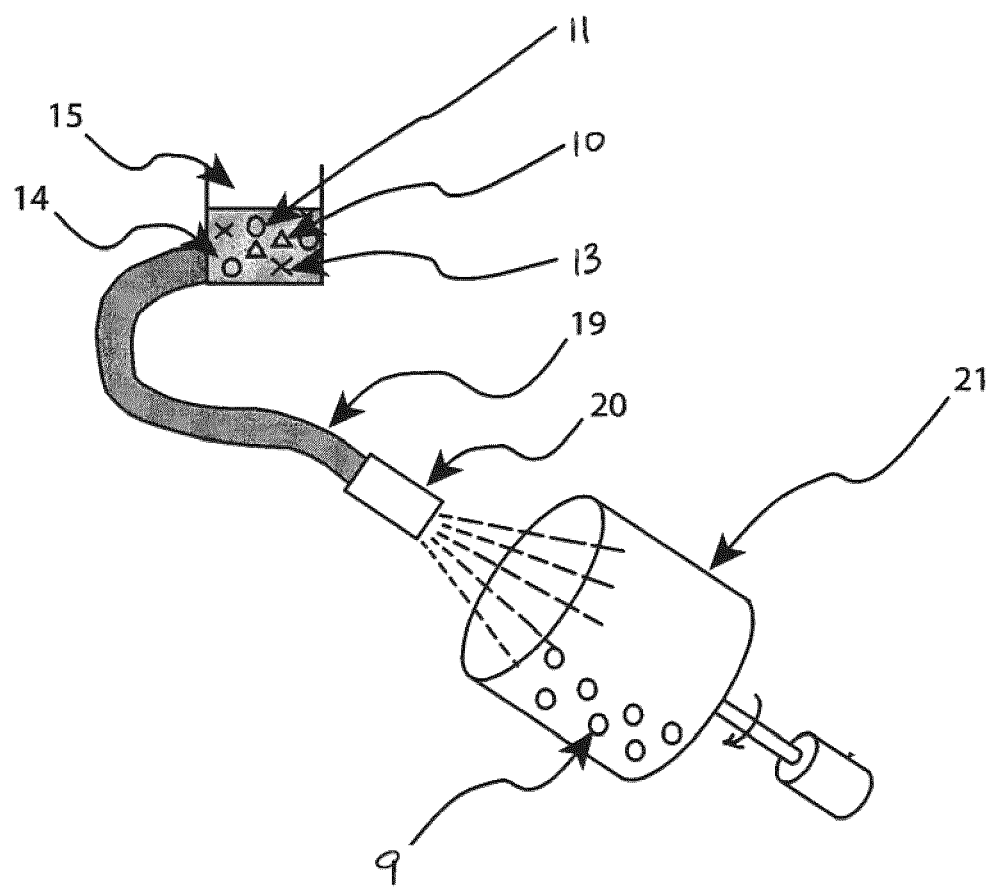
FIG. 4 is a schematic representation of a method for manufacturing the sensitizer of FIG. 3.

With reference to FIG. 4, a method of manufacturing an enhanced sensitizers according to an embodiment of the invention is illustrated. In such an embodiment, the thermoplastic polymer 12 can be dissolved in an organic solvent 14 (e.g. toluene, chloroform, etc.), and the constituents of an embodiment of the enhanced sensitizer (ie. carbon based energy activator 10, metal oxides 11; and other additives 13) are added to the mixture of polymer and solvent, and homogeneously dispersed within a container 15. In an embodiment, ultrasonification can be used to assist in homogeneously dispersing the constituents within the container 15. The homogenous solution can then be pumped to be conveyed through a hose 19 and sprayed through a nozzle 20, such as an atomizer, into a rotating drum 21 having the CBA's 9 therein. The rotation of the drum 21 ensures that each CBA has an even coating of the homogenous solution. In one embodiment the coated CBA's are rotated within the drum 21 until dry.

In alternate embodiments, enhanced sensitizers can be used as a nucleus of selective heating in micro/nano-scale. Block copolymer self-assembly can be employed as a technique to make a polymer pattern on a substrate with nanoscale precision. Microwave-assisted annealing of block copolymer thin films has been rigorously investigated and the mechanism of the microwave annealing process has been established in the art. Enhanced sensitizers according to an embodiment of the invention can be employed to facilitate localized heating for the pattern growths in micro/nano-scale.

In other embodiments, enhanced sensitizers can also be utilized with heat activated cross-linking adhesives to selectively activate a bonding process of a desired area. In one such embodiment, after patterning sensitizers on heat activated polymeric adhesives, EM waves can be applied to initiate a bonding process on a desired area only.

In-situ upgrading according to an embodiment may desirably produce more valuable hydrocarbon products with reduced sulfur content and smaller hydrocarbon chains within the reservoir. Such in-situ upgrading may be advantageous over conventional surface upgrading technologies because of the ease of transportability of products after production. Additionally in-situ upgrading may utilize energy generated to recover heavy oil/bitumen which means recovery and upgrading can take place simultaneously.

Accordingly, in yet still another embodiment, enhanced sensitizers can enable in-situ upgrading by utilizing high temperatures and high pressures generated by the exothermic chemical reactions mentioned above. In another embodiment catalysts can reduce the activation energy required for the upgrading, thereby enabling in-situ upgrading at operational temperatures which can be relatively low. (~300 deg. C.). Embodiments can utilize in-situ combustion to generate reactive upgrading gases such as CO which may be subsequently converted to $H_2$. In one fluid embodiment, reactive upgrading gases may be generated according to a chemical equation as follows.

$$CO + H_2O \rightarrow H_2 + CO_2$$

In another embodiment, CO also can be generated by an exothermic reaction of the CBA's. In an embodiment, the role of hydrogen may include: hydrocracking, hydrodesulphurization, hydrovisbreaking, etc. Hydrogen can also delay the catalyst deactivation process.

In still another embodiment, development of novel enhanced sensitizers that can be used to enhance heavy oil or bitumen recovery from oil sands, tight oils, carbonates, and oil shales with minimum water usage may be provided, to further provide one or more of the following: rapid concentration of heat; heat activated chemical reactions to produce gasses, heat, and pressure; increased heat and pressure to fracture the formation to promote flow of trapped heavy oil; produce foamy oil by the generation of gases and increased pressures; cause chain reactions in combination with chemical blowing agents with different activation temperatures to elevate temperature and gas generations; release gases, such as carbon monoxide or hydrogen for in-situ cracking and upgrading; combining heat, pressure, and released gases with catalysts to crack or upgrade heavy oil/bitumen; lower viscosity of heavy oil/bitumen to enhance fluidity and; cyclic heating and activations when needed.

In certain embodiments, enhanced sensitizers can comprise, but are not limited to carbon nanotubes (CNTs), graphenes, carbon nano fibers, graphites, carbon black, activated or amorphous carbons, ferromagnetic—iron, cobalt, nickel, zinc, barium, strontinum ferrites, etc., Catalysts such as metal oxides (iron oxide, zinc oxide, titanium oxide, aluminum oxide, zeolite, etc.), Surfactants (enhance rock wettability and decrease interfacial tensions), Polymers, Aluminum, metal nanoparticles for explosion and/or combustions, chemical Blowing Agents such as azodicarbonamide, P-toulenesulfonylhydrazide, 4,4-oxybisbenzenesulfonylhydrazide, 5-phyenyltetrazole, sodium bicarbonate, Sodium borohydride, hydrogen peroxide, sodium peroxide, etc.

In an embodiment, a method of manufacturing of novel enhanced sensitizers can include spraying techniques which may provide for multiple coats using polymers and nano particulates covering chemical blowing agents such as to prolong the life of enhanced sensitizers.

In another embodiment, chemical blowing agents having different activation temperatures, can be mixed in different combinations and can be customized to activate at different temperatures, such as to provide for activation of multiple reactions depending on the temperature level. Volume expansion due to these secondary chemical reactions can release gases resulting increase in the pore sizes of oil sands for example, resulting in better fluidity of bitumen. Released gases can also be dissolved in bitumen and form small bubbles, producing foamy oil that promotes flow of oil.

In another embodiment, in-situ upgrading catalysts can be used to break down long hydrocarbon chains to short chains and reduce sulphur contents in the presence of heat. Reactive upgrading gases generated by in-situ combustion can also promote in-situ upgrading.

In other embodiments, delivery of the enhanced sensitizers can be achieved by using so-called: "huff and puff" methods, such as by cyclic injection and activation of the sensitizers using EM waves through repeated dilation and injection steps.

In some embodiments, the sensitizers can be delivered through use of one or more of surfactants and water, steam, or through the use of petrochemicals such as diesel or solvents and/or though the combined use of hydraulic fracturing fluids and the sensitizers.

In other embodiments, polymeric open cell foams can be formed in conjunction with chemical blowing agents through activation of enhanced sensitizers to withstand subsurface pressure and to maintain pores and cracks for maintaining bitumen (heavy oil) flow paths.

In other embodiments, in order to pressurize semi-depleted reservoirs, the enhanced sensitizers can be used to pressurize and extract oil.

Yet still, in other embodiments, methods can be used to direct the flow of less viscous heavy oil/bitumen by directing the EM waves in selective manners to induce desired flow paths. Accordingly, secondary reactions can be used for selective activation and as result, in-situ combustions using the combined enhanced sensitizers and EM waves can be achieved. For example, in one embodiment, the use of vacuum (negative pressure) to promote extraction of heavy oil can also be applied.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

The invention claimed is:

1. A method for increasing fluidity of hydrocarbons in a hydrocarbon bearing formation comprising:
    injecting electromagnetically activated sensitizers into the formation;
    injecting chemical blowing agents into the formation;
    irradiating the formation with electromagnetic frequencies suitable for activating the sensitizers thereby heating the hydrocarbon bearing formation and reducing a viscosity of the hydrocarbons therein; and
    extracting the hydrocarbons,
    wherein heating the formation further comprises heating the chemical blowing agents for creating a gas and additional heat for further reduction of viscosity of the hydrocarbons.

2. The method of claim 1, wherein the sensitizers comprise one or more electromagnetically activated activators and wherein irradiating the sensitizers further comprises exposing the activators to the electromagnetic frequencies thereby exciting the activators and rapidly heating the hydrocarbon bearing formation and reducing the viscosity of the hydrocarbons therein.

3. The method of claim 1, wherein creating a gas further comprises creating foamy oil having increased fluidity.

4. The method of any one of claims 1, 2, or 3, further comprising cracking of the hydrocarbons in the hydrocarbon bearing formation.

5. The method of any one of claims 1, 2, 3, or 4, wherein the electromagnetically activated sensitizer comprises at least one of electromagnetically activated activators, catalysts, surfactants, polymers, and chemical blowing agents.

6. The method of any one of claims 1, 2, 3, 4, or 5, further comprising selectively irradiating portions of the hydrocarbon bearing formation to create a temperature gradient and a pressure gradient therein for selectively directing flow of hydrocarbons towards a production well.

7. An electromagnetically activated sensitizer for increasing fluidity of hydrocarbons in a hydrocarbon bearing formation for use in enhanced oil recovery comprising at least one of:
    an electromagnetically activated activator;
    a catalyst;
    a chemical blowing agent; and
    a thermoplastic polymer matrix for binding at least one of the electromagnetically activated activator and the catalyst coated or mixed with as a coating for coating one the chemical blowing agent.

8. The electromagnetically activated sensitizer of claim 7 further comprising at least one metal oxide.

9. The electromagnetically activated sensitizer of claim 7 or 8, further comprising at least one surfactant.

10. A method for manufacturing an enhanced sensitizer comprising:
    admixing a thermoplastic polymer with a mixture comprising at least carbon based energy activator;
    homogeneously dispersing the thermoplastic polymer and the mixture, creating a coating mixture; and
    uniformly spraying the coating mixture to cover or mix with at least one chemical blowing agent to create the enhanced sensitizer.

11. The method of claim 10, wherein the mixture further comprises at least one of metal oxides, catalysts, surfactants or a combination thereof.

12. The method of claim 10 or 11, wherein admixing the thermoplastic polymer with a mixture further comprises dissolving the thermoplastic polymer in an organic solvent.

13. The method of claim 10, 11 or 12, wherein homogeneously dispersing the thermoplastic polymer and the mixture further comprises ultrasonication.

14. A method of delivering enhanced sensitizers into a hydrocarbon bearing formation comprising:
 cyclic injection of the enhanced sensitizers into the hydrocarbon bearing formation; and
 activation of the enhanced sensitizers using the electromagnetic radiation through repeated dilation and injection steps,
 wherein injection of the enhanced sensitizers can further comprise injection of chemical blowing agents, surfactants, steam, petrochemicals such as diesel or solvents, along with the enhanced sensitizers for creating a gas and additional heat.

* * * * *